United States Patent
Kim et al.

(10) Patent No.: US 8,340,474 B2
(45) Date of Patent: Dec. 25, 2012

(54) APPARATUS AND METHOD OF BROWSING CONTENTS

(75) Inventors: Yong-sung Kim, Suwon-si (KR);
Tae-ung Jung, Suwon-si (KR);
Dong-hyun Roh, Suwon-si (KR);
So-hee Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 11/653,901

(22) Filed: Jan. 17, 2007

(65) Prior Publication Data

US 2007/0192698 A1    Aug. 16, 2007

(30) Foreign Application Priority Data

Feb. 6, 2006    (KR) .................. 10-2006-0011187

(51) Int. Cl.
*G06K 9/60* (2006.01)
*G06F 7/00* (2006.01)

(52) U.S. Cl. ................ 382/305; 707/706; 707/736

(58) Field of Classification Search ............. 382/190, 382/195, 224, 168, 305; 715/716; 345/581; 707/705, 706, 736
See application file for complete search history.

(56) References Cited

U.S. PATENT DOCUMENTS

| | | | |
|---|---|---|---|
| 6,182,069 B1 * | 1/2001 | Niblack et al. .................... | 1/1 |
| 6,370,543 B2 | 4/2002 | Hoffert et al. | |
| 6,621,926 B1 * | 9/2003 | Yoon et al. ..................... | 382/168 |
| 6,748,398 B2 | 6/2004 | Zhang et al. | |
| 7,421,376 B1 * | 9/2008 | Caruso et al. ................. | 702/190 |
| 2002/0103876 A1 | 8/2002 | Chatani et al. | |
| 2003/0187950 A1 * | 10/2003 | Rising, III .................... | 709/218 |
| 2004/0107194 A1 * | 6/2004 | Thorpe ........................ | 707/3 |
| 2004/0177069 A1 | 9/2004 | Li et al. | |
| 2005/0080769 A1 * | 4/2005 | Gemmell et al. ............... | 707/3 |
| 2005/0251748 A1 * | 11/2005 | Gusmorino et al. .......... | 715/713 |

FOREIGN PATENT DOCUMENTS

| | | |
|---|---|---|
| JP | 06274193 A | 9/1994 |
| JP | 11175535 A | 7/1999 |
| JP | 2003-006227 A | 1/2003 |
| JP | 2005-056021 A | 3/2005 |
| KR | 10-0350787 B1 | 8/2002 |
| KR | 10-2003-0084418 A | 11/2003 |
| KR | 10-2004-0035589 A | 4/2004 |

OTHER PUBLICATIONS

Kuchinsky et al., "FotoFile: A Consumer Multimedia Organization and Retrieval System", Proc. ACM CHI99 Conference on Human Factors in Computing Systems, pp. 496-503, May 1999.*

(Continued)

*Primary Examiner* — Anand Bhatnagar
*Assistant Examiner* — Soo Park
(74) *Attorney, Agent, or Firm* — Sughrue Mion, PLLC

(57) ABSTRACT

A method of browsing contents and an apparatus for browsing the same are provided. The method includes providing a plurality of characteristic vector types and a plurality of characteristic value types that correspond to a reference characteristic vector type selected from the plurality of characteristic vector types, and determining an arrangement order of preview information of contents according to a reference characteristic value type that is selected from the plurality of characteristic value types, and providing the preview information in the arrangement order.

13 Claims, 11 Drawing Sheets

OTHER PUBLICATIONS

Garber et al., "The Art of Search: A Study of Art Directors", Proc. ACM CHI92 Conference on Human Factors in Computing Systems, pp. 157-163, 1992.*

Cinque et al., "Color-based image retrieval using spatial-chromatic histograms," Image and Vision Computing 19 (2001) 979-986, 2001.*

Hyunmo Kang, et al., Visualization Methods for Personal Photo Collections: Browsing and Searching in the PhotoFinder, Multimedia and Expo, 2000, ICME 2000, 2000 IEEE International Conference, New York, Jul. 30-Aug. 2, 2000, pp. 1539-1542, USA.

George Tzanetakis et al., Marsyas3d: A Prototype Audio Browser-Editor Using a Large Scale Immersive Visual and Audio Display, Proceedings of the 2001 International Conference on Auditory Display, Jul. 29-Aug. 1, 2001, Finland.

Shiitani et al. "An online shopping service using the color feature of goods" Intelligent System Laboratory Computer Systems Laboratories Fujisu Laboratories Ltd., vol. 2002 No. 6 Jan. 2002, pp. 37-42.

Communication dated Nov. 29, 2011 issued by the Japanese Patent Office in counterpart Japanese Patent Application No. 2007-17564.

Hiroshi Shimoda, et al,<A Realtime and Automatic Gesture Classification Method based on Image Processing and Cluster Analysis>, Human Interface Society Research Report, vol. 3 No. 3, Human Interface Society, Jun. 15, 2001, pp. 57~62.

Toriwaky Junichiro, et al,<Image information processing (I)-Interpretation, Recognition-First Edition., ME Textbook series D-4, Corona Co., Ltd., Jul. 20, 2005, first edition, pp. 79~82.

* cited by examiner

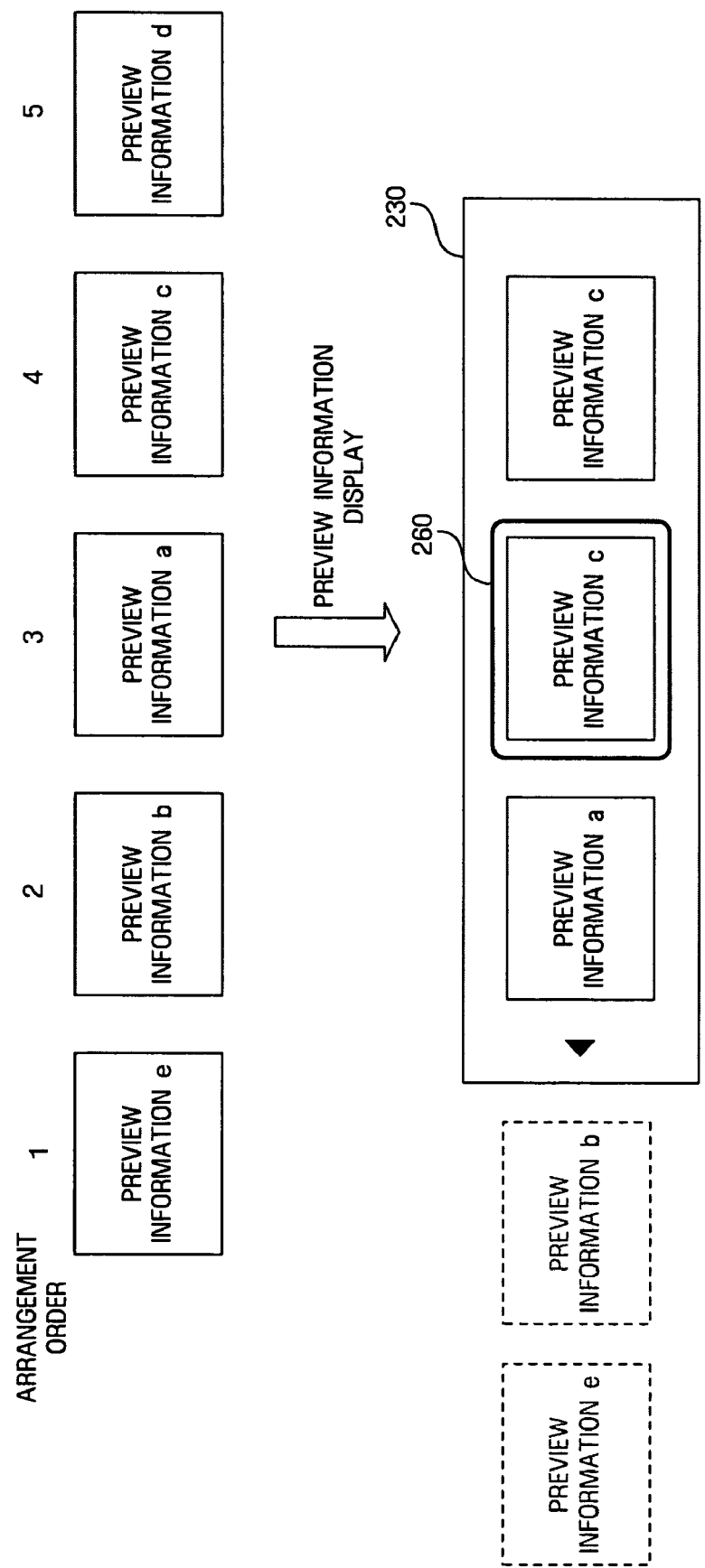

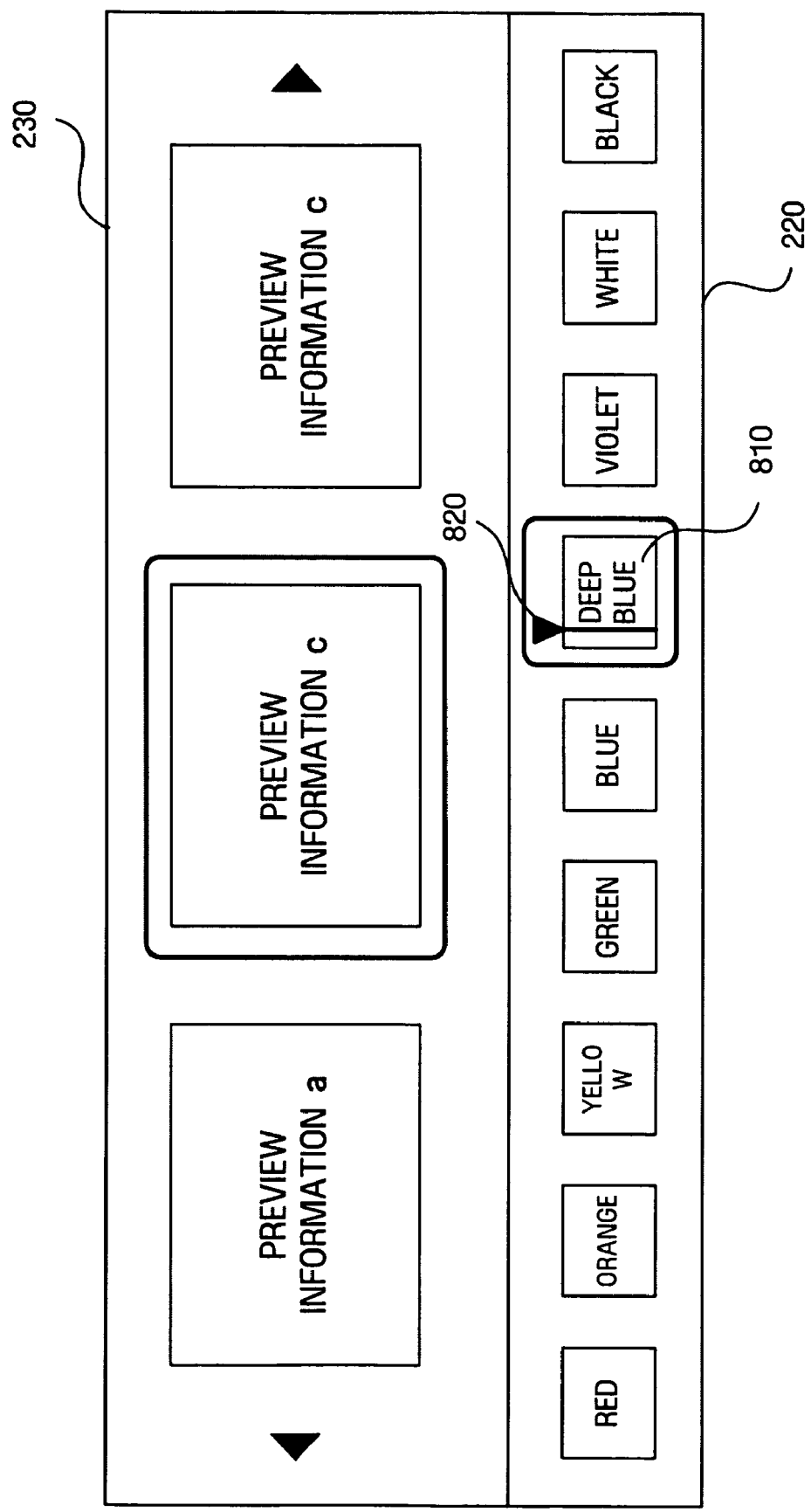

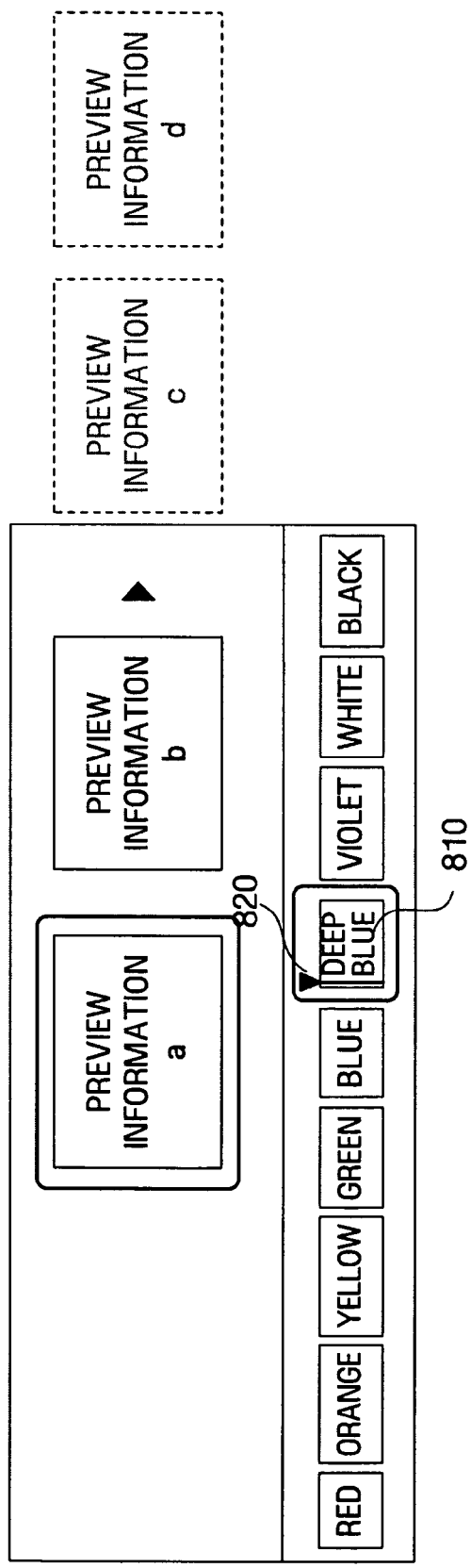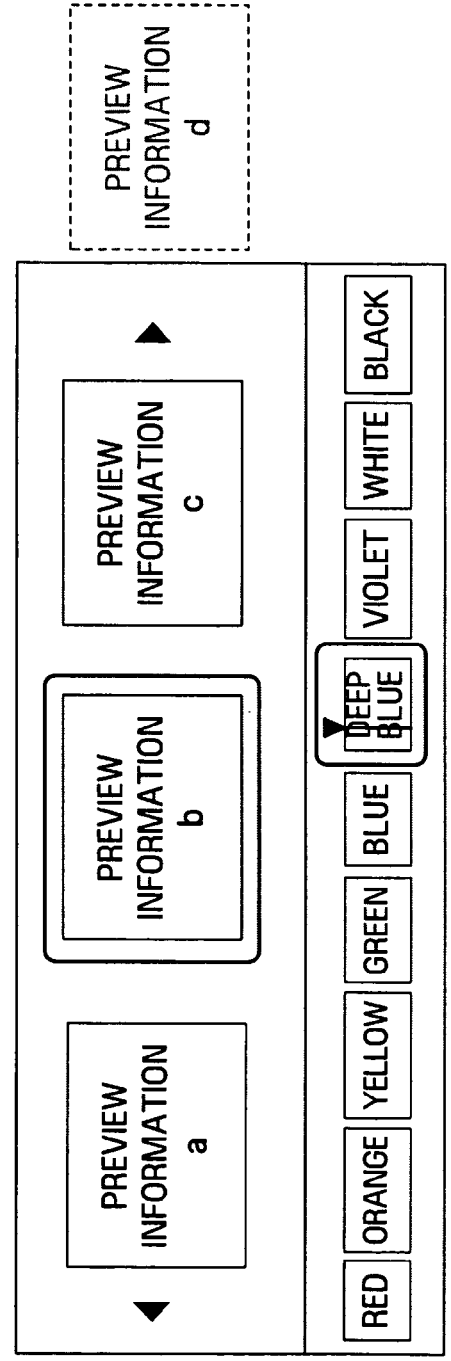

APPARATUS AND METHOD OF BROWSING CONTENTS

CROSS REFERENCE TO RELATED APPLICATION

This application claims priority from Korean Patent Application No. 10-2006-0011187 filed on Feb. 6, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to browsing contents.

2. Description of the Related Art

Recently, capacities of digital storage devices, such as hard disk drives, flash memories, or the like, have been increased, and multimedia data compression technologies have been developed. As a result, a multimedia content storing capability of a digital apparatus has been improved. For example, portable MP3 players or personal media players (PMPs) can store several tens of thousands of music contents and digital video recorders (DVRs) can store several tens of thousands of photo contents or as much as several hundreds of hours of moving picture contents.

Further, as digital apparatuses are connected to one another through a network, multimedia contents can be shared. Accordingly, an amount of multimedia contents that can be approached by one digital apparatus is continually increased.

As a result, content browsing technologies for a user to easily browse desired contents have been developed. For example, Korea Patent No. 10-0350787 (a method of creating a user profile of a multimedia object and a method of browsing multimedia using a user profile) discloses a technology for a user to use desired items at the time of multimedia browsing.

In order to efficiently browse contents, it is preferable to use content-based information that indicates characteristic of the contents. However, various kinds exist in the content-based information, and individual content-based information includes multidimensional details. Due to this, it is difficult to classify and browse contents according to content-based information on a two-dimensional screen.

SUMMARY OF THE INVENTION

The present invention provides a method of browsing contents and an apparatus for browsing the same.

According to one aspect of the present invention, there is provided a method of browsing contents, including providing a plurality of characteristic vector types and a plurality of characteristic value types that correspond to a reference characteristic vector type selected from the plurality of characteristic vector types, and determining an arrangement order of preview information of at least one or more of contents according to a reference characteristic value type that is selected from the plurality of characteristic value types, and providing the preview information in the arrangement order.

According to another aspect of the present invention, there is provided an apparatus for browsing contents, including a control unit which provides a plurality of characteristic vector types and a plurality of characteristic value types that correspond to a reference characteristic vector type selected from the plurality of characteristic vector types, an array unit which determines an arrangement order of preview information of at least one or more of contents according to a reference characteristic value type that is selected from the plurality of characteristic value types, and a preview information providing unit which provides the preview information according to the arrangement order.

BRIEF DESCRIPTION OF THE DRAWINGS

The above and other aspects of the present invention will become more apparent by describing in detail exemplary embodiments thereof with reference to the attached drawings, in which:

FIGS. 7A and 7B are diagrams illustrating a preview information display state according to an exemplary embodiment of the present invention.

DETAILED DESCRIPTION OF EXEMPLARY EMBODIMENTS OF THE INVENTION

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like identification codes refer to like elements throughout the specification.

The exemplary embodiments of the present invention will now be described more fully with reference to the accompanying drawing.

Figure 1:
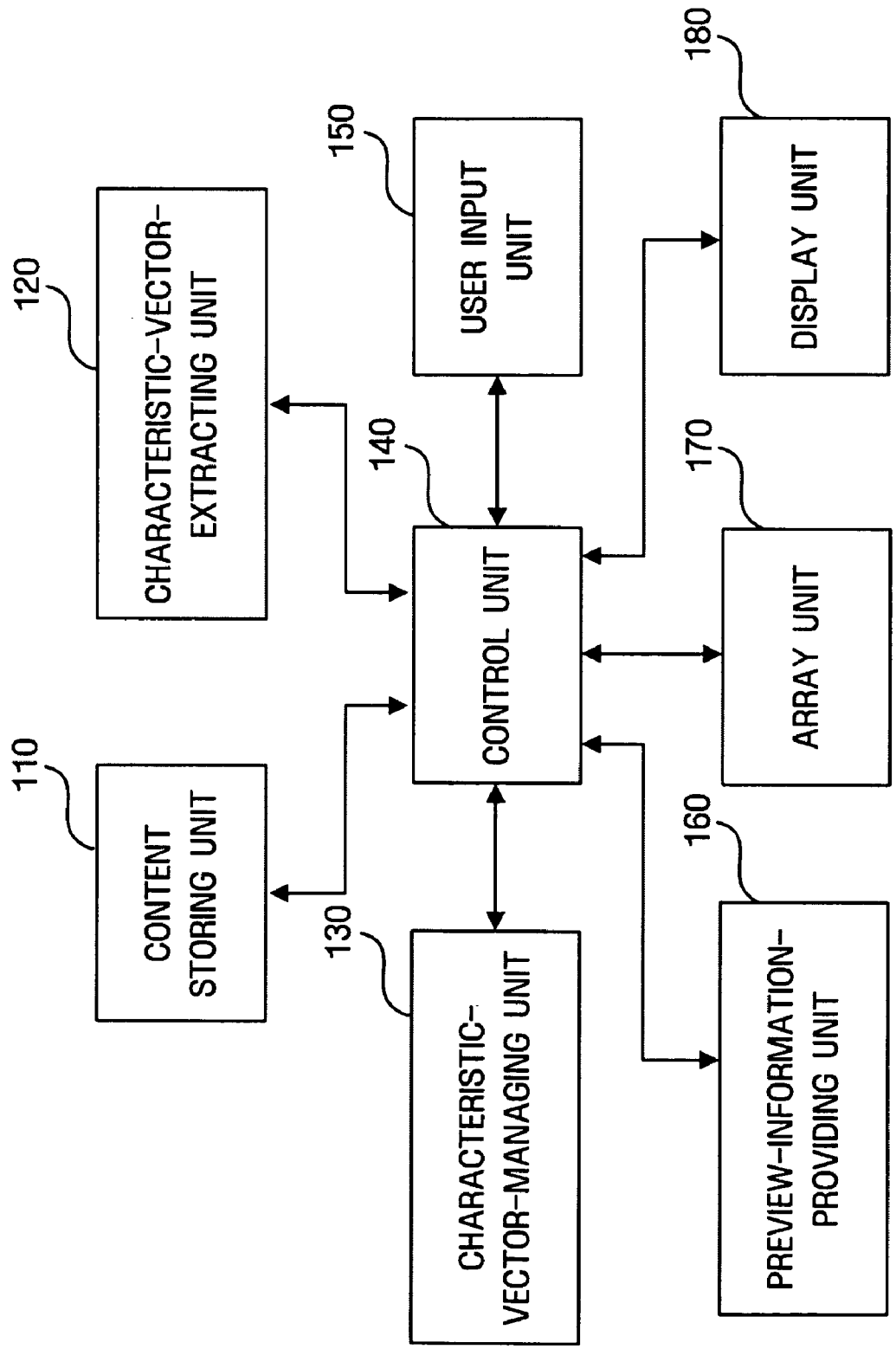
FIG. 1 is a block diagram illustrating a content browsing apparatus according to an exemplary embodiment of the present invention.

FIG. 1 is a block diagram illustrating a content browsing apparatus according to an exemplary embodiment of the present invention. The content browsing apparatus shown in FIG. 1 includes a content storing unit 110, a characteristic vector extracting unit 120, a characteristic vector managing unit 130, a control unit 140, a user input unit 150, a preview information providing unit 160, and an array unit 170.

The content storing unit 110 stores one or more contents. In this exemplary case, the contents include multimedia data, such as moving pictures, still images, audio, and the like.

The characteristic vector extracting unit 120 extracts a characteristic vector from the contents stored in the content storing unit 110. The characteristic vector describes characteristic of the contents, and refers to content-based metadata that can be obtained by analyzing the contents. Examples of the characteristic vector may include timbres, melodies, rhythms, tempos, and the like in audio contents, and include colors, textures, faces, motions, and the like in still images or moving picture contents.

If a user wants to extract a characteristic vector for a color of a still image, the characteristic vector extracting unit 120 can extract a color histogram that represents an entire color atmosphere of the image by analyzing still image contents, a dominant color that forms the image, or a color layout that represents the color distribution of the image. In this case, as a method of extracting a characteristic vector for colors, various methods may be used depending on what color space is used among various color spaces, such as RGB, HSV, HMMD, and the like, what quantization method is used among various quantization methods, and how many bins are used. Accordingly, the method of extracting a characteristic vector used by the characteristic vector extracting unit 120 is not limited to a specific algorithm, and various methods may be used in the respective exemplary embodiments. For reference, as one example of a related art for a method of extracting a characteristic vector, "a color and motion characteristic extracting algorithm for browsing content-based moving pictures," Journal of Korea Multimedia Society, Vol. 4, No. 2, pp. 187-196, 1999, has suggested a characteristic extracting algorithm that can reflect color histogram information of moving pictures and space distribution information of colors.

Generally, the characteristic vector is composed of a plurality of characteristic values. For example, the color histogram that represents an entire color atmosphere of an image can be represented by arranging ratios occupied by N representative colors in the image. In this case, the characteristic vector called the color histogram is composed of N characteristic values. If the color histogram is extracted for an image by using nine colors including red, orange, yellow, green, blue, deep blue, violet, white, and black as representative colors, a characteristic vector for a color histogram is constructed by arranging nine characteristic values.

According to an exemplary embodiment of the present invention, the characteristic vector extracting unit 120 may perform a standardization work such that each of characteristic values constituting the characteristic vector extracted from the contents has the same dynamic range. As an example, the characteristic vector extracting unit standardizes the standard deviation of the characteristic values, such that each of the characteristic values has the same dynamic range.

Meanwhile, MPEG-7 of ISO/IEC that is an international standard organization is a standard for a method of representing a characteristic vector for content-based browsing. The method of extracting the characteristic vector from the contents is not included in a standard range of MPEG-7. If the contents stored in the content storing unit 110 are based on the MPEG-7 standard, the characteristic vector extracting unit 120 can extract the characteristic vector of the contents according to a method defined by MPEG-7.

The characteristic vector managing unit 130 stores and manages the characteristic vectors extracted by the characteristic vector extracting unit 120. The characteristic vector managing unit 130 maps the characteristic vectors to the contents stored in the content storing unit 110, respectively. That is, a characteristic vector extracted from a content A is mapped to the content A. Therefore, it can be understood that each characteristic vector is related to a corresponding content. If a specific content is deleted in the content storing unit 110, the characteristic vector managing unit 130 deletes the characteristic vector that is mapped to the deleted content.

The user input unit 150 receives a predetermined control request input by a user. In order to receive the control request, the user input unit 150 may include an input unit, such as a key pad, a touch pass, a touch screen, and the like. In various exemplary embodiments, the user input unit 150 may receive and process a control signal input by a remote controller. In this case, the user may input a desired control request through the remote controller.

The preview information providing unit 160 provides preview information of the contents stored in the content storing unit 110. The preview information indicates specifications for the contents. Examples of the preview information of the music contents may include titles, genres, artists, album information, reproducing times, and the like, and examples of the preview information of the movie contents may include players, titles, directors, reproducing times, stories, and the like. This preview information may be extracted from supplement data appended to the contents. Examples of a field including supplemental data may include an ID3 tag that is appended to the audio content of an MP3 format, Exif information that is appended to the image contents of a JPEG format, an MPEG header that is appended to the moving picture content of an MPEG-2 format, and the like.

If the contents include images, such as photographs or diagrams, the preview information providing unit 160 may provide thumbnails or images of the contents as preview information.

The control unit 140 controls an operation process of the content browsing apparatus. In particular, the control unit 140 provides a characteristic vector list and a characteristic value list, and controls the display unit 180 displaying the user interface according to the control request by the user input through the user input unit 150.

The array unit 170 determines an arrangement order of the preview information that is provided by the preview information providing unit 160.

The display unit 180 displays the user interface for browsing the contents according to control by the control unit 140. For display, the display unit 180 may include an LCD, a PDP, an organic EL, and the like. One example of the user interface that is displayed by the display unit 180 is illustrated in FIG. 2.

Figure 2:
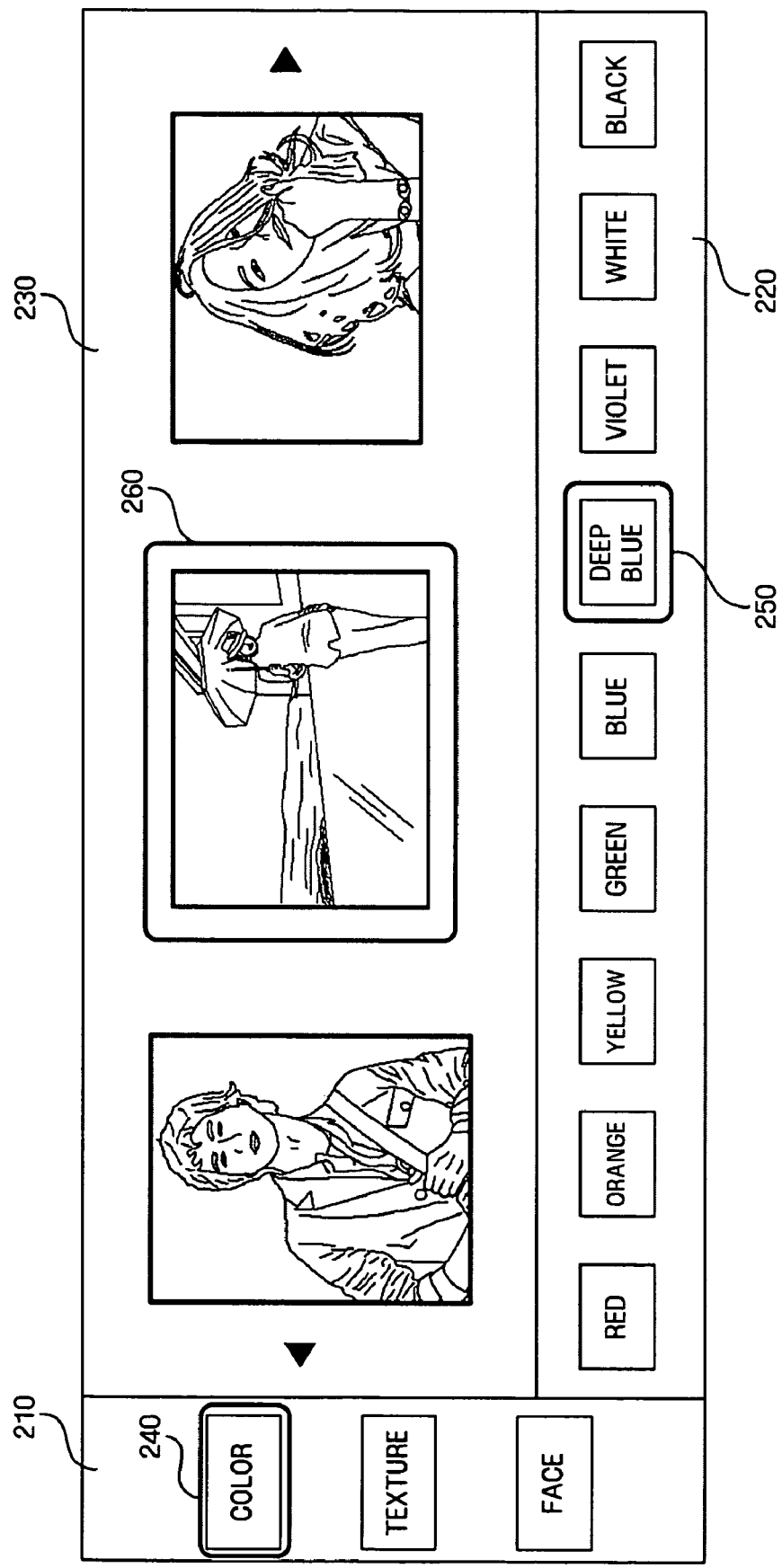
FIG. 2 is a diagram illustrating a user interface according to an exemplary embodiment of the present invention.

The user interface shown in FIG. 2 includes a first display region 210 and a second display region 220 where the characteristic vector list and the characteristic value list provided by the control unit 140 are respectively displayed, and a third display region 230 where the preview information provided by the preview information providing unit 160 is displayed.

The characteristic vector list that is displayed in the first display region 210 includes types of characteristic vectors (hereinafter, referred to as characteristic vector type) extracted from the contents by the characteristic vector extracting unit 120, and it may be set when the content browsing apparatus is implemented. The types of respective characteristic vectors that are included in the characteristic vector list may be provided in types of texts, diagrams, icons, colors, and the like. In the example shown in FIG. 2, the characteristic vector types, such as colors, textures, and faces, are displayed in texts.

The user can operate the user input unit 150 or the remote controller to select or change a reference characteristic vector type from the characteristic vector list. The control unit 140 may allow the reference characteristic vector type to be easily recognized by the user through color variation, highlight, icon addition, size variation, circumference display, and the like. In the example shown in FIG. 2, the color 240 is selected as the reference characteristic vector type.

The characteristic value list that is displayed in the second display region 220 represents types of characteristic values (hereinafter, referred to as characteristic value types) that form the reference characteristic vector type selected from the characteristic vector list displayed in the first display region 210, and it may be set when the content browsing apparatus is implemented. The respective characteristic value types that are included in the characteristic value list may be provided in types of texts, diagrams, icons, colors, and the like. In the example shown in FIG. 2, nine characteristic value types of red to black are displayed in texts. The characteristic value types shown in FIG. 2 represent colors, and the characteristic value types may be displayed together with corresponding colors when the content browsing apparatus is implemented.

The user can operate the user input unit 150 or the remote controller so as to select or change the reference characteristic value type from the characteristic value list. The control unit 140 may allow the reference characteristic vector type to be easily recognized by the user through color variation, highlight, icon addition, size variation, circumference display, and the like. In the example shown in FIG. 2, deep blue 250 is selected as the reference characteristic value type.

In the third display region 230, the preview information for the contents stored in the content storing unit 110 is provided according an arrangement order that is determined on the basis of the reference characteristic value type selected from the characteristic value list displayed in the second display region 220. The arrangement order of the preview information is determined by the array unit 170. In the example shown in FIG. 2, the thumbnails of the contents are used as the preview information, but the present invention is not limited thereto.

The preview information may be one-dimensionally arranged. In the example shown in FIG. 2, the preview information is arranged in the widthwise direction, but the present invention is not limited thereto. For example, the preview information may be arranged in a lengthwise direction.

A selector 260 of highlight, icon display, color variation, circumference display, and the like, may be located in the reference preview information selected from a plurality of preview information. The user can operate the user input unit 150 or the remote controller to change the reference preview information, thereby browsing contents. For example, if the user pushes down a rightward button of the remote controller, the user input unit 150 analyzes a user's control request, and then transmits it to the control unit 140. At this time, the control unit 140 can move the selector 260 onto a preview information image that is adjacent to the right side of the preview information instructed by the selector 260. Alternatively, in a state in which the selector 260 is fixed, the preview information may move leftward at predetermined intervals such that the selector 260 may instruct new preview information.

Further, in an exemplary embodiment of the present invention, when a portion of the preview information is displayed in the third display region 230, the preview information that is located at the center may be set to the reference preview information. In this case, when the user requests the control unit 140 to change the reference preview information, the control unit 140 moves the locations of the preview information so as to change the reference preview information.

At this time, each of the respective components in the exemplary embodiments, relates to, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, an operation process of the above-mentioned content browsing apparatus will be described.

Figure 3:
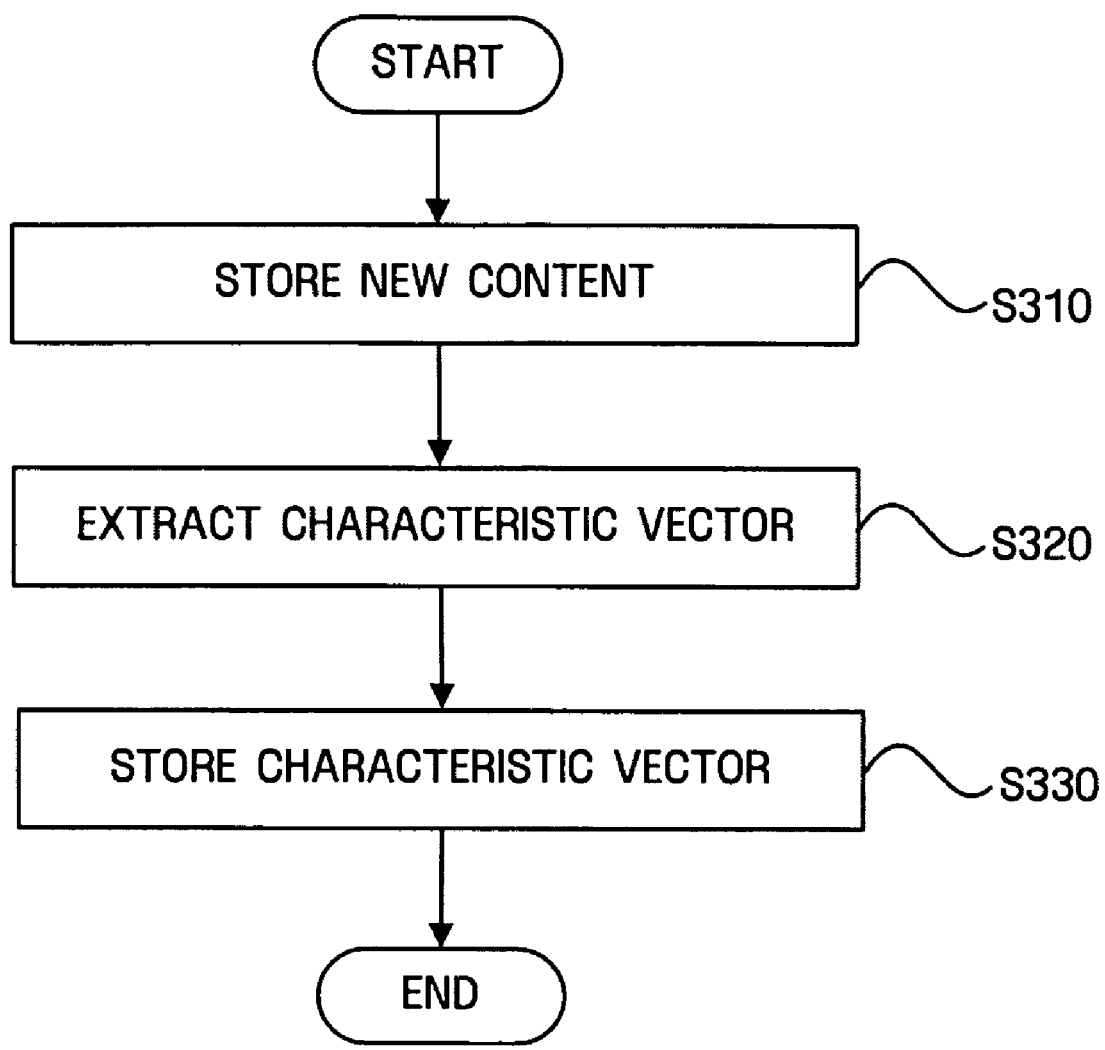
FIG. 3 is a flowchart illustrating a characteristic vector storing process according to an exemplary embodiment of the present invention.

FIG. 3 is a flowchart illustrating a characteristic vector storing process according to an exemplary embodiment of the present invention.

If a new content is stored in the content storing unit 110 (S310), the characteristic vector extracting unit 120 analyzes the content stored in the content storing unit so as to extract a characteristic vector (S320). At this time, the characteristic vector extracting unit 120 may perform a standardization work such that each of the plurality of characteristic values forming the extracted characteristic vector has the same dynamic range. Multiple types of the specific vectors may be extracted from one content by the characteristic vector extracting unit.

Then, the characteristic vector managing unit 130 stores the characteristic vectors extracted by the characteristic vector extracting unit 120 (S330). At this time, the characteristic vector managing unit 130 may map the characteristic vectors to the contents stored in the content storing unit 110, respectively.

Figure 4:
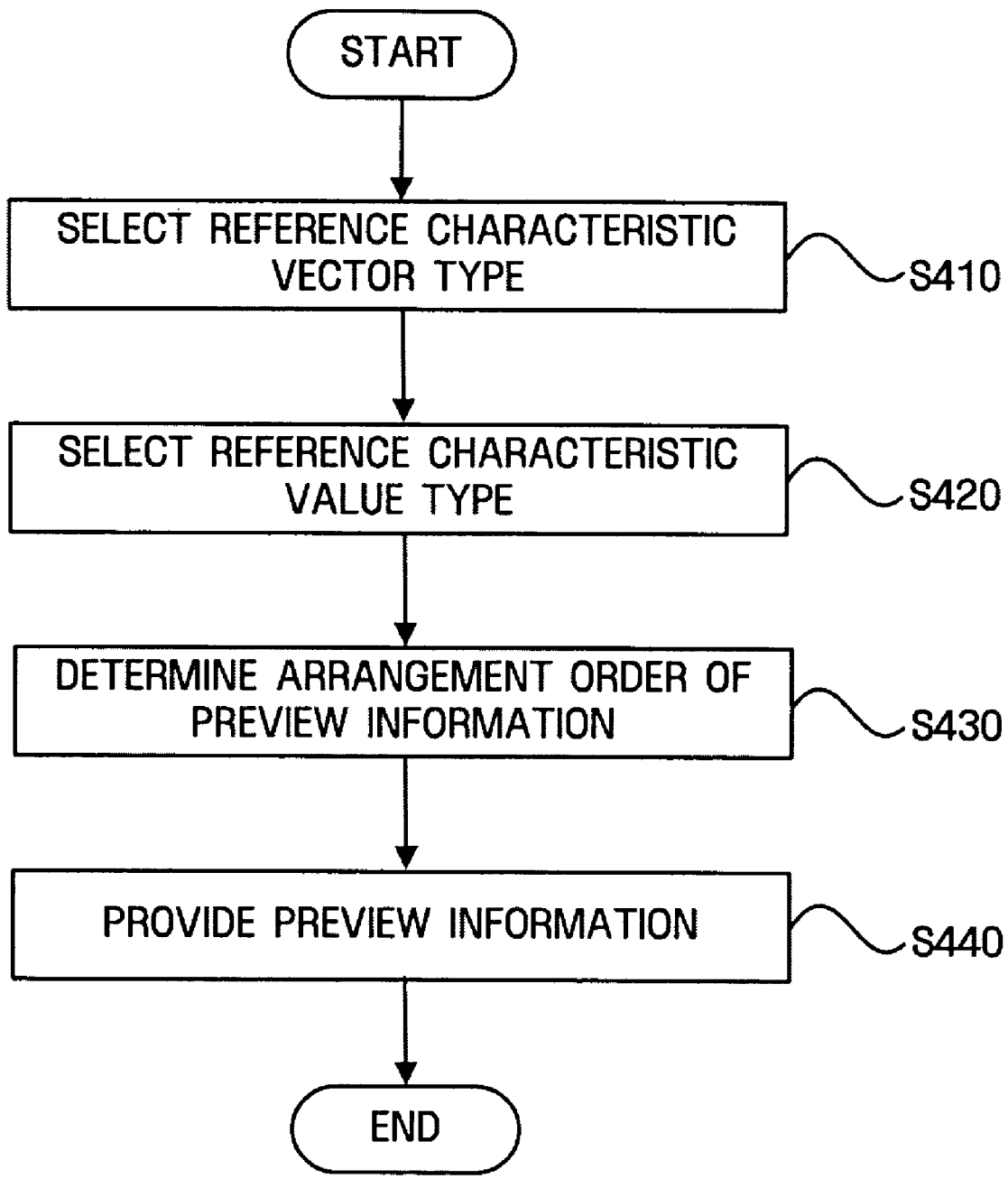
FIG. 4 is a flowchart illustrating a method of browsing contents according to an exemplary embodiment of the present invention.

FIG. 4 is a flowchart illustrating a method of browsing contents according to an exemplary embodiment of the present invention.

If the content browsing starts, the control unit 140 selects the reference characteristic vector type from the characteristic vector list (S410). In this case, the characteristic vector list indicates types of the characteristic vectors extracted from the contents by the characteristic vector extracting unit 120, and may be set in advance. What characteristic vector type is selected as the reference characteristic vector type depends on various exemplary embodiments. For example, as the reference characteristic vector type, the control unit 140 may select any characteristic vector type or reselect the characteristic vector type having been selected as the most recent reference characteristic vector type.

If the reference characteristic vector type is determined, the control unit 140 selects the reference characteristic value type from the characteristic value list for the reference characteristic vector type (S420). In this case, the characteristic value list indicates kinds of the characteristic values that form the characteristic vector type, and may be set in advance. What characteristic value type is selected as the reference characteristic value type depends on various exemplary embodiments. For example, as the reference characteristic value type, the control unit 140 may select any characteristic value type or reselect the characteristic value type having been selected as the most recent reference characteristic value type. In another exemplary embodiment, the control unit 140 may analyze characteristic values that form the characteristic vector corresponding to the reference characteristic vector type among the characteristic vectors of the contents corresponding to the reference preview information, and select a characteristic value type having the largest characteristic value as the reference characteristic value type. The reference preview information may be selected as any preview information among a plurality of preview information, or selected as the preview information having been used as the most recent reference preview information.

If the reference characteristic value type is determined, the array unit 170 determines an arrangement order of preview information according to the reference characteristic value type (S430). In order to determine the arrangement order of preview information, the array unit 170 may browse the characteristic values of the respective contents corresponding to the reference characteristic value type from the characteristic vector managing unit 130, and determine the arrangement order of preview information of the respective contents in a size order of the browsed characteristic values.

Then, the preview information providing unit 160 provides the preview information according to the determined arrangement order (S440). Alternatively, the preview information provided by the preview information providing unit 160 may be arranged according to the arrangement order determined by the control unit 140.

The characteristic vector list, the characteristic value list, and the preview information, which are suggested in the processes of FIG. 4, are displayed through the display unit 180 according to the control of the control unit 140. The user may browse the displayed preview information, and in this process, the reference preview information may be changed.

Figure 5:
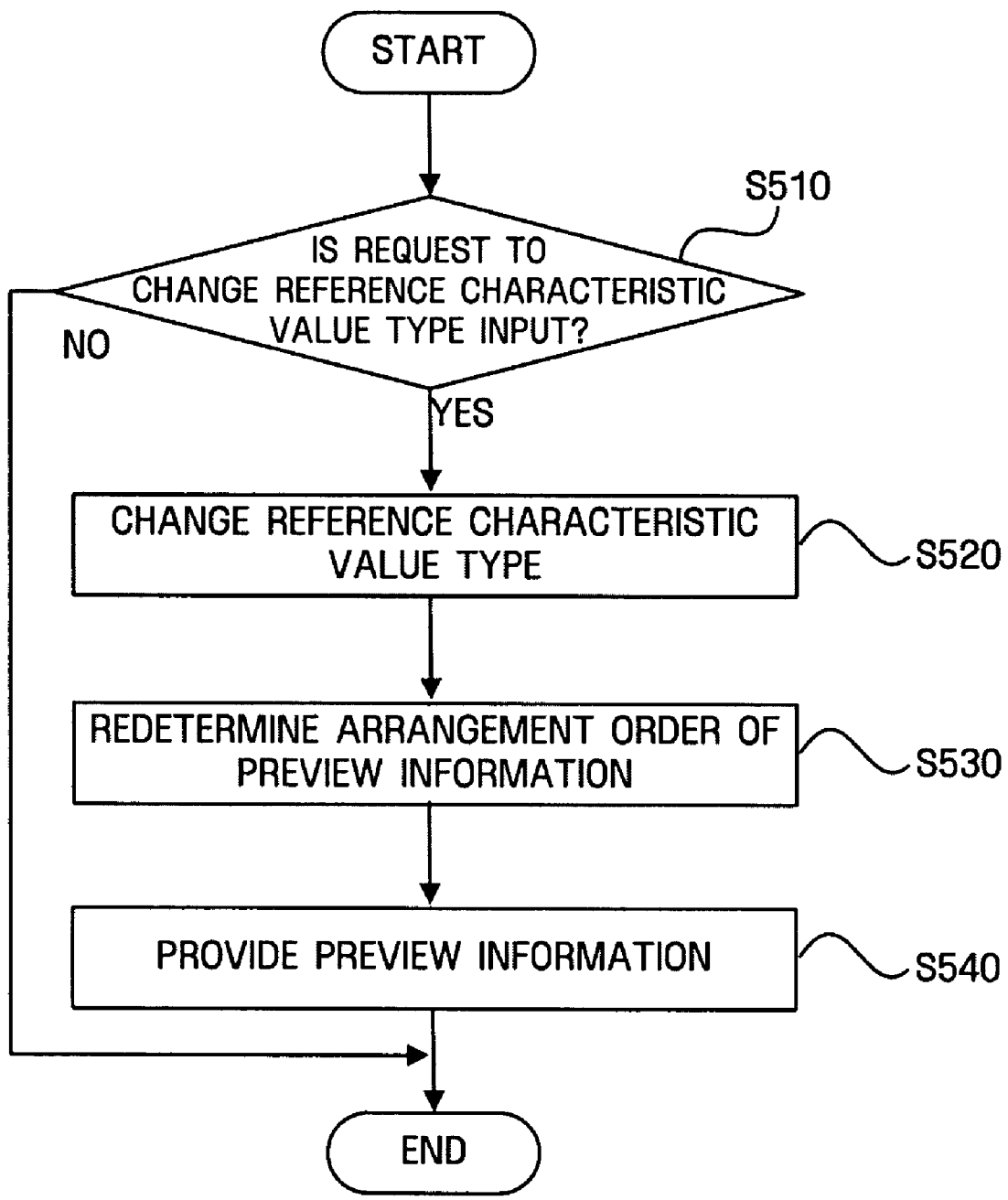
FIG. 5 is a flowchart illustrating a user interface providing process according to a modification of a reference characteristic value type according to an exemplary embodiment of the present invention.

FIG. 5 is a flowchart illustrating a user interface providing process according to variation of a reference characteristic value type according to an exemplary embodiment of the present invention.

If a change request for the reference characteristic value type is input by the user input unit 150 (S510), the control unit 140 changes the reference characteristic value type (S520).

At this time, the array unit 170 may predetermine the arrangement order of the preview information according to the changed reference characteristic value type (S530).

Then, the preview information providing unit 160 provides preview information according to a new arrangement order (S540).

In FIG. 5, the preview information provided according to the changed state of the reference characteristic value type and the new arrangement order are displayed through the display unit 180.

Figure 6:
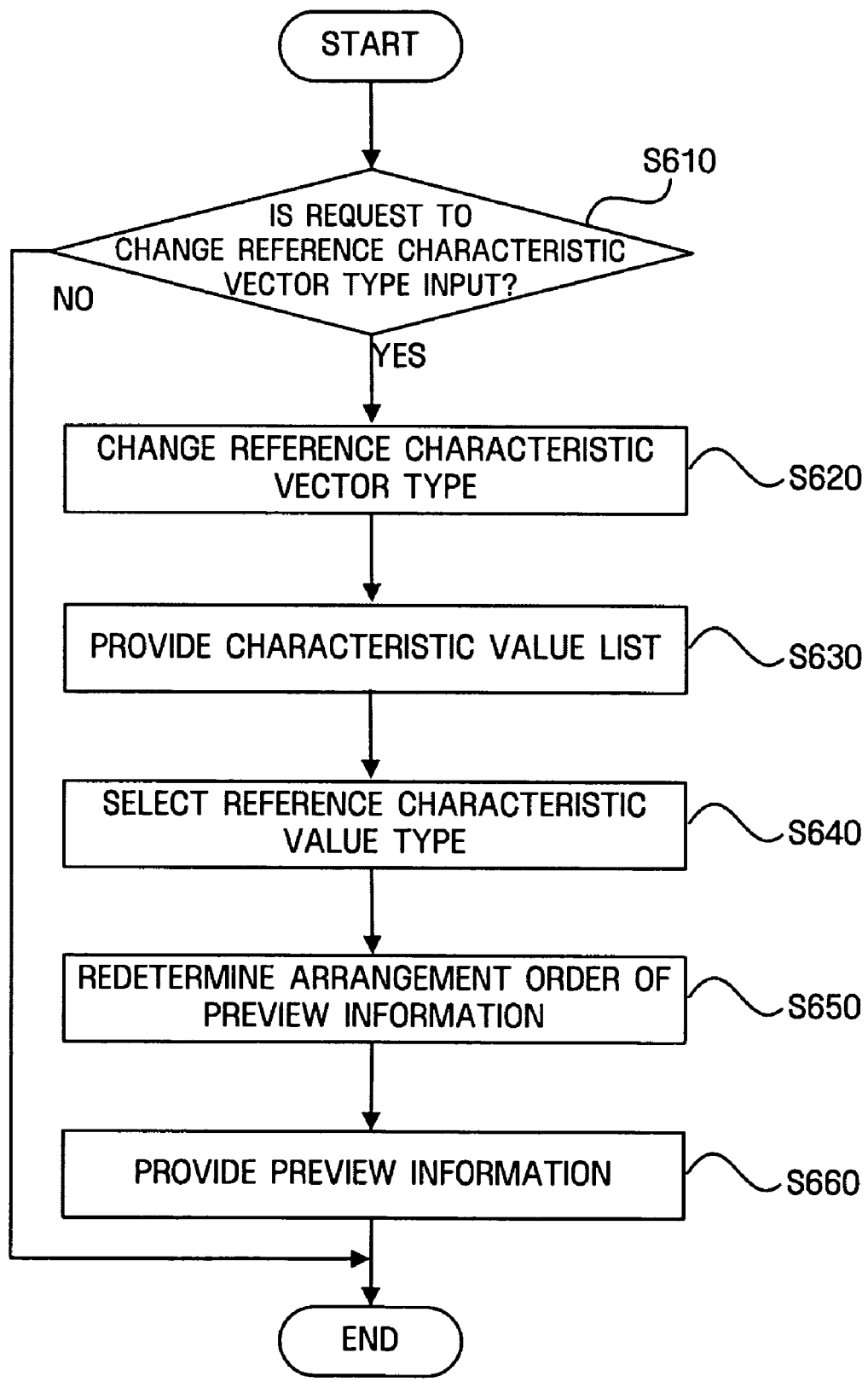
FIG. 6 is a flowchart illustrating a user interface providing process according to a modification of a reference characteristic value type according to an exemplary embodiment of the present invention.

FIG. 6 is a flowchart illustrating a user interface providing process according to a variation of the reference characteristic vector type according to an exemplary embodiment of the present invention.

If a change request for the reference characteristic value type is input by the user input unit 150 (S610), the control unit 140 changes the reference characteristic vector type (S620).

If the reference characteristic vector type is changed, the control unit 140 provides the characteristic value list that is constructed by the characteristic value type included in the new reference characteristic vector type (S630).

At this time, the control unit 140 selects the reference characteristic value type from the characteristic value list (S640). In this case, what characteristic value type is selected as the reference characteristic vector type depends on various exemplary embodiments. For example, as the reference characteristic vector type, the control unit 140 may select any characteristic value type or reselect the characteristic value type having been selected as the most recent reference characteristic value type from the provided characteristic value list. In another exemplary embodiment, the control unit 140 may analyze characteristic values that form the characteristic vector corresponding to the changed reference characteristic vector type among the characteristic vectors of the contents corresponding to the reference preview information, and select a characteristic value type having the largest characteristic value as the reference characteristic value type.

Then, the array unit 170 predetermines an arrangement order of the preview information according to the changed reference characteristic value type (S650), and the preview information providing unit 160 provides preview information according to the new arrangement order (S660).

Meanwhile, even if the arrangement order of the preview information is changed through the processes shown in FIGS. 5 and 6, the control unit 140 can maintain the existing reference preview information. Accordingly, the preview information displayed through the processes in FIGS. 5 and 6 can be displayed on the basis of the existing reference preview information. This exemplary embodiment will be described with reference to FIGS. 7A and 7B.

Figure 7A:
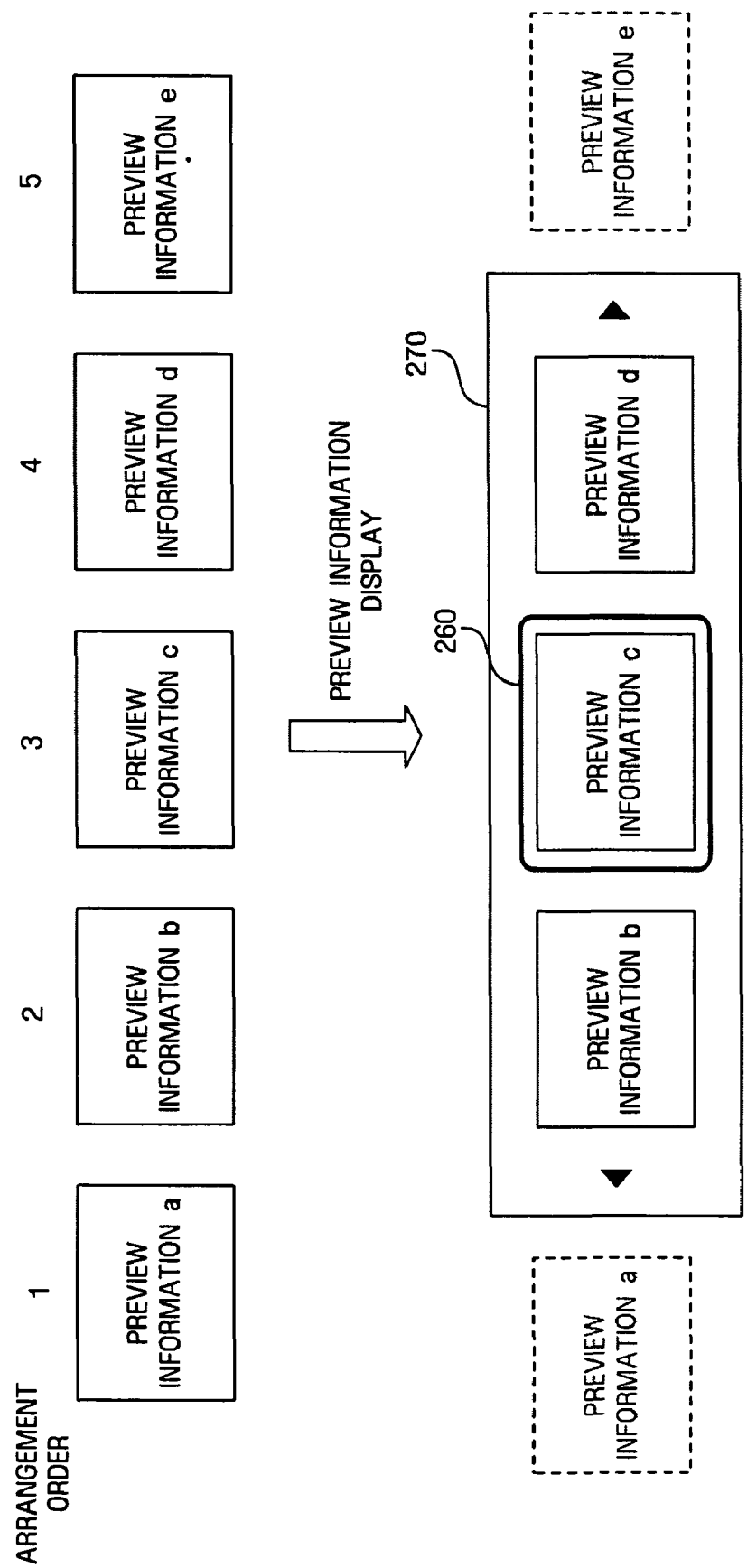

FIGS. 7A and 7B illustrate a state in which an arrangement order of five preview information and the preview information are displayed in the third display region 230 among the user interfaces described with reference to FIG. 2. In FIGS. 7A and 7B, the preview information shown by dotted lines indicates a state in which it is not displayed in the third display region 230.

First, as shown in FIG. 7A, in a state in which the arrangement order of five preview information is determined, it is assumed that preview information b, preview information c, and preview information d are displayed in the third display region 230. Since the selector 260 is located at the preview information c among the preview information b, c, and d, it can be understood that the preview information c is selected as the reference preview information.

In this state, even though the arrangement order of the preview information is changed through the processes of FIGS. 5 and 6, according to the present invention, the third display region displays the preview information on the basis of the reference preview information, which is shown in FIG. 7B. In FIG. 7B, the arrangement order of the preview information is changed, and thus the order of the preview information c is changed from the third (see FIG. 7A) to the fourth. However, the third display region 230 is still displaying the preview information on the basis of the preview information c that corresponds to the reference preview information. Therefore, even though the arrangement reference of the preview information (reference characteristic vector type or reference characteristic value type) is changed, the user can continuously browse without interruption.

Figure 8D:
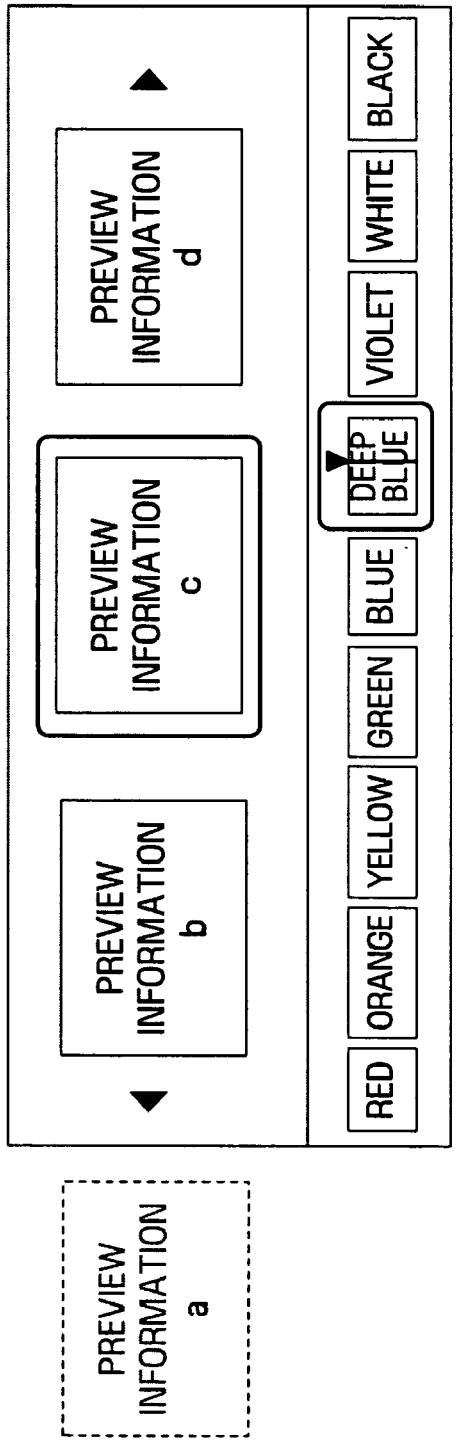
FIGS. 8A and 8E are diagrams illustrating a browsing location information providing state according to an exemplary embodiment of the present invention.
Figure 8E:
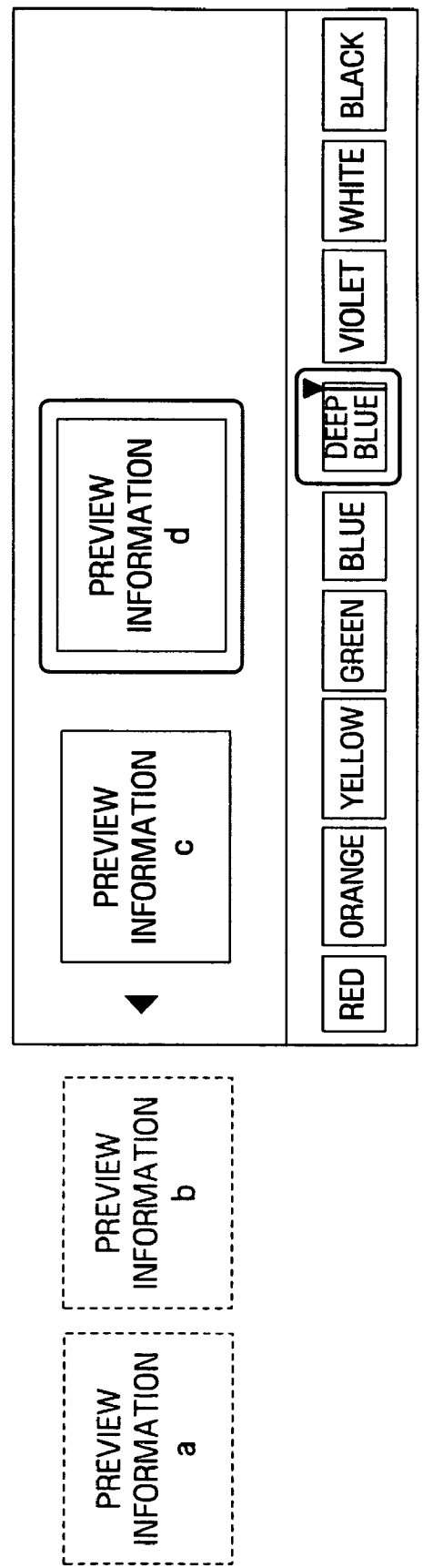

Meanwhile, according to one exemplary embodiment of the present invention, the control unit 140 can provide information about browsing locations of the preview information to the region that displays the reference characteristic value type. This exemplary embodiment is shown in FIG. 8A. In FIG. 8A, the second display region 220 and the third display region 230 are shown in the user interface described with reference to FIG. 2. As shown in FIG. 8A, a pointer 820 may be provided to a deep blue icon 810 that is a reference characteristic value type, and the point 820 indicates a current browsing location. If the pointer 820 is located leftward on the deep blue icon 810, it indicates that preview information having high priority is being browsed, and if the pointer 820 is located rightward on the deep blue icon 810, it indicates that preview information having low priority is being browsed. Specifically, each of the locations of the pointer 820 may correspond to the order of the reference preview information among all preview information. FIGS. 8B to 8E are diagrams illustrating a moving state of the pointer 820 according to the browsing situation of the preview information according to an exemplary embodiment of the present invention. In FIGS. 8B to 8E, preview information shown by dotted lines indicates preview information that is not displayed. As shown in FIG. 8B to 8E, if preview information having low priority is selected as reference preview information, the pointer 820 moves rightward on the icon 810 of the reference characteristic value type.

Although the present invention has been described in connection with the exemplary embodiments of the present invention, it will be apparent to those skilled in the art that various modifications and changes may be made thereto without departing from the scope and spirit of the present invention. Therefore, it should be understood that the above exemplary embodiments are not limitative, but illustrative in all aspects.

In an apparatus for browsing contents and a method of browsing contents according to the present invention, browsing of the contents can be easily performed.

What is claimed is:

1. A method of browsing contents, the method comprising:
analyzing a plurality of contents and determining, from the analyzed contents, a plurality of characteristic vector types, each of the plurality of characteristic vector types indicating a content-based characteristic of the plurality of contents and each of the plurality of characteristic vector types comprising a plurality of characteristic value types;
determining, for each of the plurality of contents, a value of each of the plurality of characteristic value types and, for each of the plurality of characteristic vector types, standardizing the values of the plurality of characteristic value types to a same dynamic range;
displaying the plurality of characteristic vector types;
receiving a first selection input of a first one of the displayed plurality of characteristic vector types;
displaying the standardized plurality of characteristic value types of the selected first one of the displayed plurality of characteristic vector types;
receiving a second selection input of a first one of the displayed standardized plurality of characteristic value types of the selected first one of the displayed plurality of characteristic vector types;
determining a first arrangement order of the plurality of contents according to the values of the selected first one of the displayed standardized plurality of characteristic value types of the selected first one of the displayed plurality of characteristic vector types for the plurality of contents;
displaying the plurality of contents in the first arrangement order;
receiving an input of a user that selects one of the displayed plurality of contents, and displaying a location of the selected one of the displayed plurality of contents within the first arrangement order of the displayed plurality of contents;
receiving a third selection input of one of (i) a second one of the displayed plurality of characteristic vector types and (ii) a second one of the displayed standardized plurality of characteristic value types of the selected first one of the displayed plurality of characteristic vector types;
determining a second arrangement order of the plurality of contents according to one of (i) values of a reference characteristic value type among the plurality of characteristic value types that is associated with the second one of the displayed plurality of characteristic vector types for the plurality of contents, if the third selection input selects the second one of the displayed plurality of characteristic vector types, and (ii) values of the second one of the displayed standardized plurality of characteristic value types of the selected first one of the displayed plurality of characteristic vector types for the plurality of contents, if the third selection input selects the second one of the displayed standardized plurality of characteristic value types of the selected first one of the displayed plurality of characteristic vector types;
displaying the plurality of contents in the second arrangement order while maintaining display of the selected one of the displayed plurality of contents, and displaying a second location of the selected one of the displayed plurality of contents within the second arrangement order of the displayed plurality of contents.

2. The method of claim 1, wherein the plurality of contents comprises one of audio contents and video contents.

3. The method of claim 2, wherein the plurality of contents comprise video contents and the first one of the displayed plurality of characteristic vector types comprises one of colors of images of the video contents, textures of the images of the video contents, faces of subjects in the images of the video contents, and motions in the images of the video contents.

4. The method of claim 3, wherein the first one of the displayed plurality of characteristic vector types comprises the colors of the images of the video contents generated by determining a color histogram that represents N colors for each of the plurality of contents,
wherein the determining the value of each of the characteristic value types comprises determining a value of one of the N colors for each of the plurality of contents, and
wherein the displaying the plurality of contents in the first arrangement order comprises displaying the plurality of contents according to the values of the one of the N colors that is the first one of the displayed standardized plurality of characteristic value types.

5. The method of claim 1, wherein the reference characteristic value type has a largest characteristic value among characteristic values that correspond to the second one of the displayed plurality of characteristic vector types.

6. The method of claim 1, wherein the plurality of contents is one-dimensionally displayed.

7. An apparatus for browsing contents, the apparatus comprising:
a control unit which analyzes a plurality of contents, determines, from the analyzed contents, a plurality of characteristic vector types, each of the plurality of characteristic vector types indicating a content-based characteristic of the plurality of contents and each of the plurality of characteristic vector types comprising a plurality of characteristic value types, determines for each of the plurality of contents, a value of each of the plurality of characteristic value types and, for each of the plurality of characteristic vector types, standardizes the values of the plurality of characteristic value types to a same dynamic range, displays the plurality of characteristic vector types, receives a first selection input of a first one of the displayed plurality of characteristic vector types, displays the standardized plurality of characteristic value types of the selected first one of the displayed plurality of characteristic vector types, and receives a second selection input of a first one of the displayed standardized plurality of characteristic value types of the selected first one of the displayed plurality of characteristic vector types;

an array unit which determines a first arrangement order of the plurality of contents according to the values of the selected first one of the displayed standardized plurality of characteristic value types of the selected first one of the displayed plurality of characteristic vector types for the plurality of contents; and a preview information providing unit which displays the plurality of contents in the arrangement order and, in response to the control unit receiving an input of a user that selects one of the displayed plurality of contents, displays a location of the selected one of the displayed plurality of contents within the first arrangement order of the displayed plurality of contents, wherein the control unit receives a third selection input of one of (i) a second one of the displayed plurality of characteristic vector types and (ii) a second one of the displayed standardized plurality of characteristic value types of the selected first one of the displayed plurality of characteristic vector types, the array unit determines a second arrangement order of the plurality of contents according to one of (i) values of a reference characteristic value type among the plurality of characteristic value types that is associated with the second one of the displayed plurality of characteristic vector types for the plurality of contents, if the third selection input selects the second one of the displayed plurality of characteristic vector types, and (ii) values of the second one of the displayed standardized plurality of characteristic value types of the selected first one of the displayed plurality of characteristic vector types for the plurality of contents, if the third selection input selects the second one of the displayed standardized plurality of characteristic value types of the selected first one of the displayed plurality of characteristic vector types, and the preview information providing unit displays the plurality of contents in the second arrangement order while maintaining display of the selected one of the displayed plurality of contents, and displaying a second location of the selected one of the displayed plurality of contents within the second arrangement order of the displayed plurality of contents.

8. The apparatus of claim 7, wherein the plurality of contents comprises one of audio contents and video contents.

9. The apparatus of claim 8, wherein the plurality of contents comprise video contents and the first one of the displayed plurality of characteristic vector types comprises one of colors of images of the video contents, textures of the images of the video contents, faces of subjects in the images of the video contents, and motions in the images of the video contents.

10. The apparatus of claim 9, wherein the first one of the displayed plurality of characteristic vector types comprises the colors of the images of the video contents generated by the control unit determining a color histogram that represents N colors for each of the plurality of contents, wherein the control unit determines the value of each of the characteristic value types by determining a value of one of the N colors for each of the plurality of contents, and wherein the preview information providing unit displays the plurality of contents in the first arrangement order according to the values of the one of the N colors that is the first one of the displayed standardized plurality of characteristic value types.

11. The apparatus of claim 7, wherein the reference characteristic value type has a largest characteristic value among characteristic values that correspond to the second one of the displayed plurality of characteristic vector types.

12. The apparatus of claim 7, wherein the control unit controls the preview information providing unit to display the plurality of contents so as to be one-dimensionally displayed.

13. A method of browsing contents, the method comprising:

analyzing a plurality of audio contents and determining, from the analyzed plurality of audio contents, a plurality of characteristic vector types, each of the plurality of characteristic vector types indicating a content-based characteristic of the plurality of audio contents, and each of the plurality of characteristic vector types comprising a plurality of characteristic value types;

determining, for each of the plurality of audio contents, a value of each of the plurality of characteristic value types and, for each of the plurality of characteristic vector types, standardizing the values of the plurality of characteristic value types to a same dynamic range;

determining a first arrangement order of the plurality of audio contents according to the values of a first one the plurality of characteristic value types of a first one of the plurality of characteristic vector types for the plurality of audio contents;

displaying the plurality of audio contents in the first arrangement order;

receiving an input of a user that selects one of the displayed plurality of audio contents, and displaying a location of the selected one of the displayed plurality of audio contents within the first arrangement order of the displayed plurality of audio contents;

receiving a selection input of one of (i) a second one of the plurality of characteristic vector types and (ii) a second one of the plurality of characteristic value types of the first one of the plurality of characteristic vector types;

determining a second arrangement order of the plurality of contents according to one of (i) values of a reference characteristic value type among the plurality of characteristic value types that is associated with the second one of the plurality of characteristic vector types for the plurality of contents, if the selection input selects the second one of the plurality of characteristic vector types, and (ii) values of the second one of the plurality of characteristic value types of the first one of the plurality of characteristic vector types for the plurality of contents, if the selection input selects the second one of the plurality of characteristic value types of the first one of the plurality of characteristic vector types; and displaying the plurality of audio contents in the second arrangement order while maintaining display of the selected one of the plurality of audio contents, and displaying a second location of the selected one of the plurality of audio contents within the second arrangement order of the displayed plurality of audio contents, wherein the characteristic vector type comprises one of a timbre, a melody, a rhythm, and a tempo of the plurality of audio contents.

* * * * *